April 9, 1957 J. W. LENEHAN 2,788,087
GAS CLEANING APPARATUS
Filed April 7, 1955 2 Sheets-Sheet 2
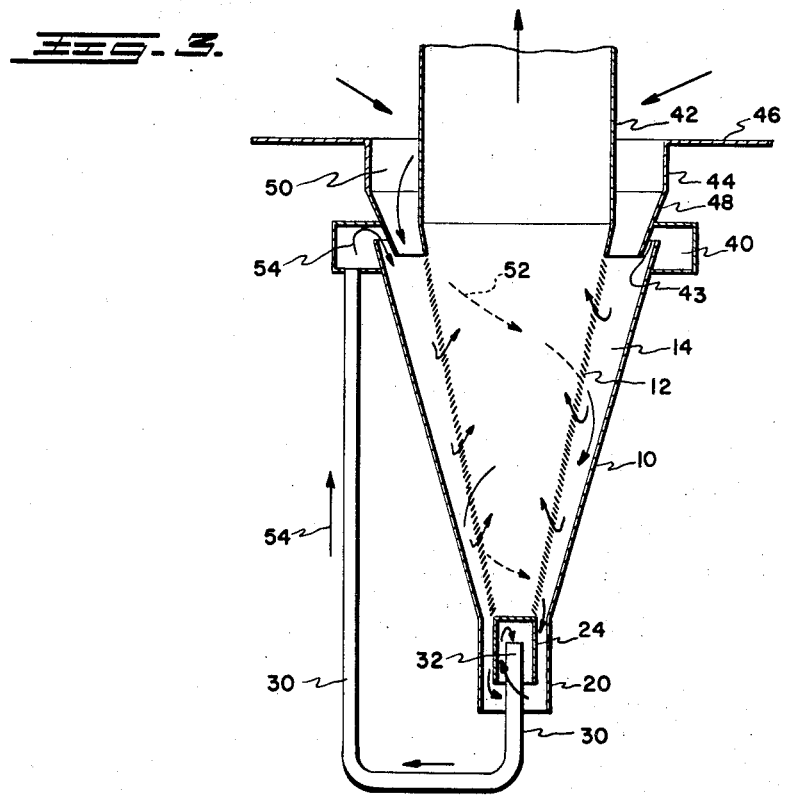
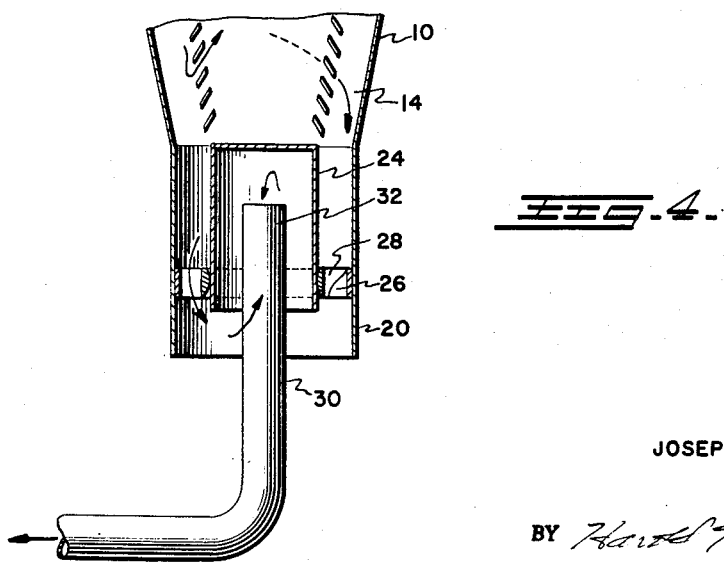
INVENTOR
JOSEPH W. LENEHAN
BY
ATTORNEY

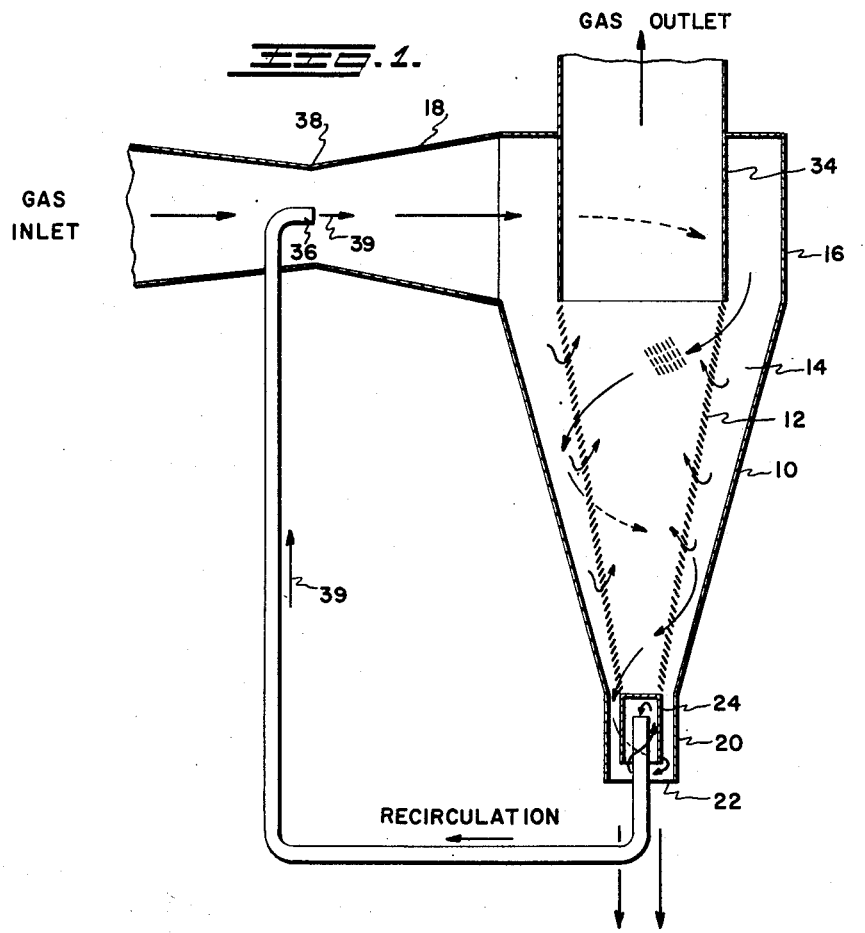
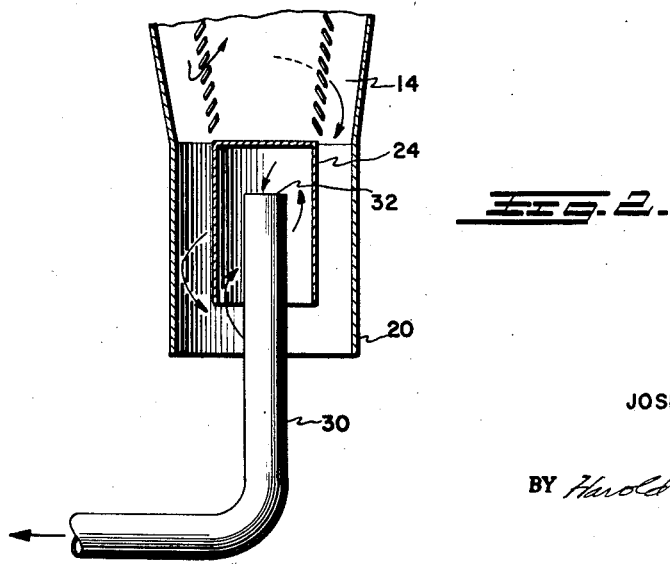

United States Patent Office 2,788,087
Patented Apr. 9, 1957

2,788,087

GAS CLEANING APPARATUS

Joseph W. Lenehan, New Brunswick, N. J., assignor to Research Corporation, New York, N. Y., a corporation of New York Application April 7, 1955, Serial No. 499,878

4 Claims. (Cl. 183—89)

The present invention relates to separators and more particularly and specifically to skimmer type separators utilized for removing suspended particulate material from gaseous fluid currents.

It is a general object of the present invention to provide a gas separator of the skimmer type which incorporates advantageous, unique and useful structural improvements eliminating substantially all of the disadvantages inherent in prior constructions and, at the same time, producing a separator of a superior and more efficient operation.

A primary object of this invention is to provide a separator which structurally combines the features of a skimmer type collector with a secondary stage separating or collecting cyclone in a single component unit.

Another object is to provide a separator which eliminates the necessity of providing auxiliary mechanical apparatus for operating and controlling the secondary cyclone phase of the unit.

A further object of the present invention lies in the provision of a gas separator which embodies in a single unit three dust separating effects without increasing the requirement for auxiliary mechanical components beyond those required for a single effect separator.

Still another object is the provision of a gas separator which operates at a substantially increased efficiency over prior art devices without substantial increases in the initial costs or maintenance of the improved apparatus.

A still further object of this invention lies in the provision of a gas separator of the skimmer type which will accommodate a greater volume of gas flow without loss of operating efficiency.

An additional object of this invention is to provide a gas separator of the type heretofore described which is of simple and inexpensive design and construction yet which is durable and efficient over long periods of use.

Still further objects and advantages of this invention will become more readily evident to those skilled in the art when the following general statement and description are read in the light of the accompanying drawings.

The nature of the present invention may be stated in general terms as relating to a skimmer type gas separator including a housing tapering longitudinally in cross section, said housing having a gas inlet and a primary and a secondary gas outlet, a conical filter duct of louvered wall construction located coaxially within the tapered housing, means for directing gas entering said housing through said inlet convolutely about said conical filter duct longitudinally of the housing, said primary gas outlet communicating with the interior of said conical filter duct, an inverted cyclone separator associated with said secondary gas outlet remote to said gas inlet, and said secondary outlet through said cyclone separator communicating with an aspirator operated by the flow of gas entering the inlet in said housing.

Referring now to the accompanying drawings in which like numerals designate similar parts throughout the several views:

Fig. 1 is a vertical section through the separator constituting the present invention;

Fig. 2 is an enlarged fragmentary section illustrating the secondary cyclone separator unit;

Fig. 3 is a vertical section of a modified form of the separator of the invention; and Fig. 4 is an enlarged fragmentary section through the secondary cyclone unit of a modified construction.

In the embodiment of the present invention shown in Figs. 1 and 2, the improved separator comprises an elongated conical housing 10 having a filter cone 12 mounted coaxially therein providing a channel 14 longitudinally of the housing defined between the outer surface of the filter cone and the inner wall of the surrounding housing, the channel 14 being gradually reduced in cross sectional area toward the reduced or apex end of the cone and surrounding housing.

The larger end of the housing 10 is enclosed by a cylindrical chamber 16 which has communication with a tangential gas inlet 18.

The smaller end of the conical housing 10 is provided with a cylindrical extension 20 having an open extended end 22 therein communicating with a collection hopper (not shown). Located concentrically within the cylindrical extension 20 of the housing 10 and defining with the walls of the cylindrical extension 20 a continuation of channel 14 is an inverted tubular cup or separator tube 24. A discharge pipe 30 extends into the opening in the separator tube 24 with the end 32 terminating at a spaced distance below the upper closed end of the tube 24.

The other end of the filter cone 12 is provided with a cylindrical discharge tube 34 which extends outwardly through the end-enclosing chamber 16 of the housing 10 to communicate with, for example, a collection system for purified gas. The discharge pipe 30 originating within the inverted cyclone separator formed by the separator tube 24 communicates with an open ended nozzle construction 36 located concentrically within a Venturi section 38 formed in the gas inlet line 18, the nozzle 36 being disposed in the direction of gas flow into the separator thereby producing aspiration of the gas in the secondary cyclone and returning it, as indicated by arrows 39, to the gas stream entering the separator.

The filter cone 12 is formed by a plurality of tongues or vanes positioned at substantially right angles to the path of gas flow through the housing 10. The vanes serve to separate gas and particles suspended therein by surface separation principles well known in the art to cause the separated particles to fall through the channel 14 of the housing into the collection hopper while the purified gas is turned and collected within he filter cone and discharged outwardly through tube 34 to a collection point.

It has been discovered that by utilizing a separator constructed in accordance with the present disclosures and embodying an inverted cyclone separator unit as shown and described that approximately 95 percent of the gas introduced tangentially into the separator will be efficiently separated by the filter cone 12 and returned to a collection point, and that approximately 5 percent of the gas introduced into the separator will be separated by the secondary inverted cyclone effect which will be drawn off and returned by the aspirator construction to the gas flow entering the separator in advance of the initial separator unit.

In the modified construction of the present separator as is shown in Figs. 3 and 4 the housing 10 and filter cone 12 are substantially identical with those constructions heretofore described including the secondary cyclone structure at the reduced end of the housing formed by separator tube 24 and discharge pipe 30.

In the secondary cyclone collector structure in the modification of the invention shown in Figs. 3 and 4, a ring member 26 is mounted concentrically about the cup member 24 within the continuation of channel 14 defined between cup 24 and the walls of the housing extension 20. Ring member 26 mounts a plurality of gas spinner vanes 28 which increase the convolute flow of materials passing through the extension 20 before the point therein where the cyclone separating action takes place.

The upper end of the modified form of the housing 10 is provided with a small annular chamber 40 which communicates with the upper open end of the housing 10 and into which the extended end of the outlet pipe 30 projects providing communication between the secondary cyclone unit of the separator and the chamber 40. The enlarged end of the filter cone 12 communicates with an outlet tube 42 extending concentrically outwardly through the enclosed chamber 40 to a collection system for the purified gas. Concentrically about the outlet tube 42 is a gas inlet passage or tube 44 communicating with a gas inlet header 46. The gas inlet passage or tube 44 is located concentrically of outlet tube 42 and extends inwardly of the housing 10 where it is provided on its inner end with a tapered extension 48 which enters through the chamber 40 to lie concentrically about the upper end of the conical filter 12 and the outer walls of which are spaced inwardly from the inner wall of the housing 10 providing a circumferential restricted opening 43 between the annular chamber 40 and the interior of the housing 10.

Within the gas inlet passage 44 is provided a plurality of spinner vanes 50 which impart a spiral flow to the gas entering from the header 46 into the housing so that such gas will move through said housing convolutely, as indicated by arrows 52, about the conical filter 12 in the channel 14 defined between the filter and the inner wall of the housing in the same manner as heretofore described with reference to Figs. 1 and 2 of the drawings.

In this construction, the incoming flow of gas through the gas inlet 44 will produce a zone of low pressure at the circumferential restricted opening 43 thereby drawing off gas separated in the inverted secondary cyclone unit as illustrated by arrows 54.

Thus, in accordance with the foregoing construction, a modified form of the gas separator previously described is provided which will operate with substantially the same characteristics and with the same advantages as has heretofore been described relative to the embodiment shown in Figs. 1 and 2.

Accordingly, improved and unique gas separator constructions have now been disclosed which embody all of the advantageous characteristics of prior art apparatus and which also include new and useful structures which accomplish all of the objects and advantages heretofore attributed to the present invention.

Having thus described and explained the improved construction of and new and useful results obtained by the present invention, what is desired to be claimed is:

1. Gas separator apparatus including a housing, a tapered filter member mounted coaxially within the housing, a gas inlet communicating with one end of the housing externally of the filter member, a gas outlet communicating with the interior of the filter member, an inverted cup mounted coaxially in said housing remote from the gas inlet, a gas discharge conduit, one end of the gas discharge conduit extending coaxially into the open end of said cup, the other end of the discharge conduit communicating wth the gas inlet, and gas flow constricting means in the gas inlet to provide a zone of low pressure about the other end of the discharge conduit.

2. Gas separator apparatus including an elongated conical housing, a conical filter member mounted coaxially in the housing and defining with the housing walls a circumferential passage longitudinally of the housing, a gas inlet communicating with said passage adjacent the larger end of the housing, a gas outlet communicating with the interior of the conical filter member at its larger end, a cyclone collector, said cyclone collector including an inverted cup mounted coaxially in said housing in continuation of the smaller end of the filter member, spinning vanes concentrically mounted about the cup in the housing, a gas discharge conduit connecting the secondary collector and the gas inlet of the housing, said gas dischearge conduit extending coaxially into the open end of said cup concentrically of said vanes and having an open end terminating at a spaced distance from the closed end of said cup, and means providing a zone of low pressure adjacent said discharge conduit in the gas inlet housing.

3. In a separator for separating suspended particles from a gas current, a conical housing, a conical filter member mounted coaxially in the housing and defining with the housing walls a circumferential passage longitudinally of the housing of decreasing cross sectional area toward the smaller end of the housing, a gas inlet communicating with said passage adjacent the larger end of the housing, means for directing gas entering said inlet into a centrifugal flow longitudinally through said passage and about said filter member, an inverted cup member mounted coaxially in the smaller end of the housing in extension of the smaller end of the conical filter member, gas spinning vanes mounted in the smaller end of the housing concentrically about the cup member, a discharge outlet for separated suspended material in the smaller end of said housing, and a gas discharge conduit extending coaxially into said cup member concentrically of said spinning vanes and having an open end terminating in spaced relationship to the closed end of the cup, said gas conduit having aspirated communication with the gas inlet of the housing.

4. The invention defined in claim 1, wherein the gas flow constricting means comprises a gradually converging passage followed by a gradually diverging passage and said other end of the discharge conduit opens into the zone between said passages.

References Cited in the file of this patent

UNITED STATES PATENTS

| | | |
|---|---|---|
| 1,353,431 | Sims | Sept. 21, 1920 |
| 1,856,685 | Anderson | May 3, 1932 |
| 2,571,331 | Blomen | Oct. 16, 1951 |

FOREIGN PATENTS

| | | |
|---|---|---|
| 130,572 | Sweden | Nov. 2, 1900 |